United States Patent Office 3,133,183
Patented May 12, 1964

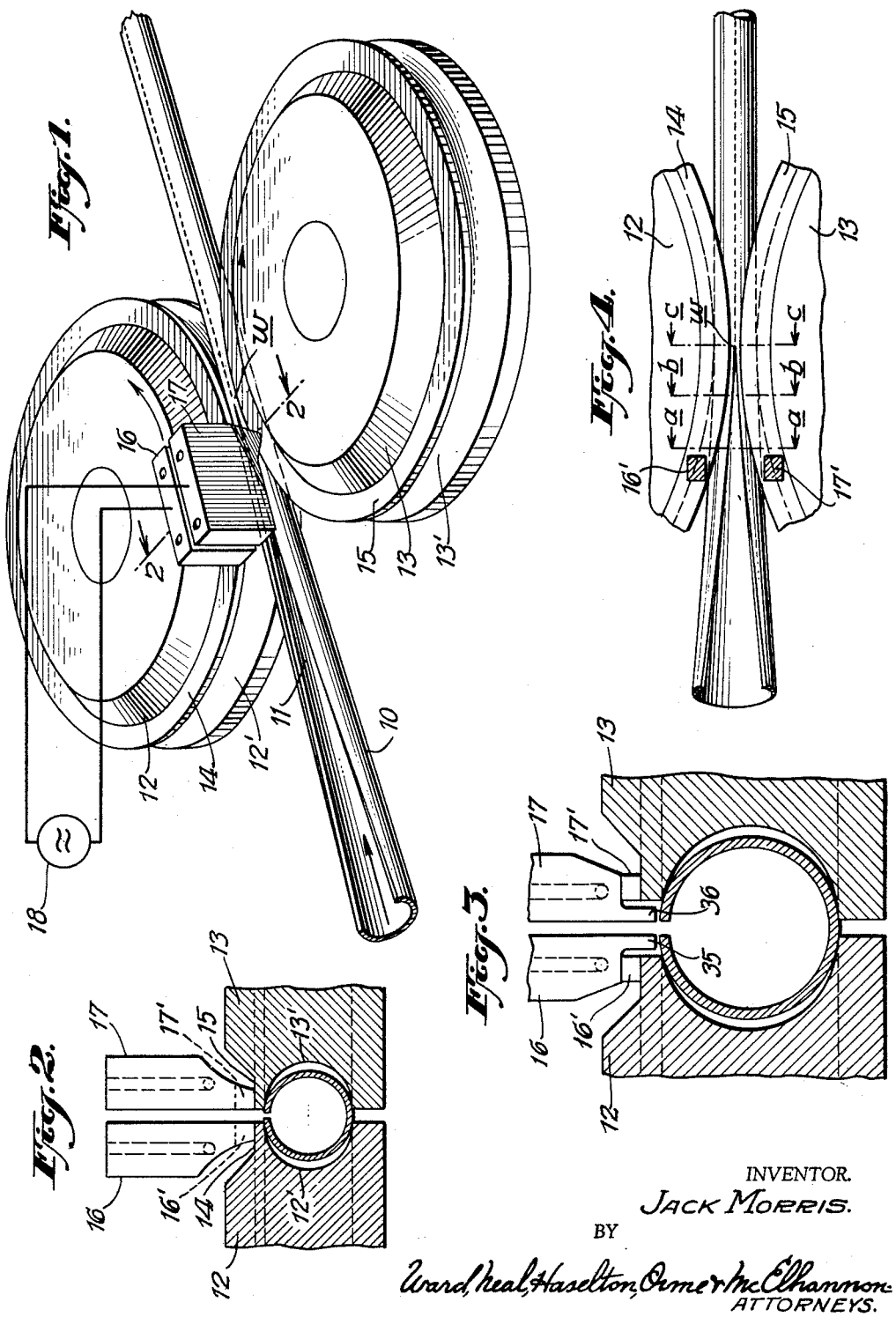

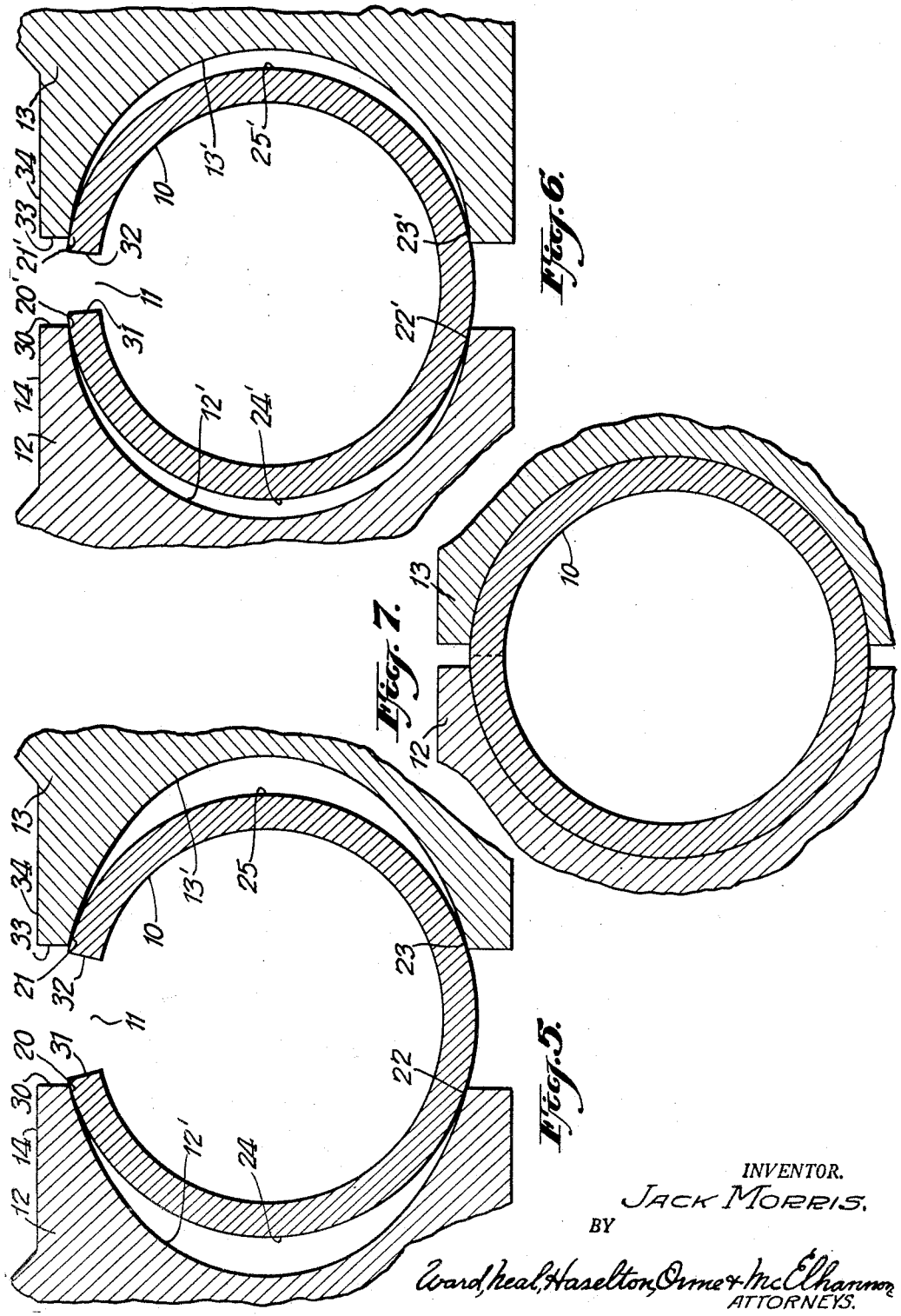

3,133,183
WELDING OF TUBING
Jack Morris, Monsey, N.Y., assignor, by mesne assignments, to American Machine & Foundry Company, New York, N.Y., a corporation of New Jersey
Filed Oct. 5, 1961, Ser. No. 143,205
7 Claims. (Cl. 219—59)

This invention relates to methods and apparatus for welding metal tubing by the use of high frequency electrical heating currents conductively applied.

It has become well known to weld a longitudinal seam in metal tubing by the use of high frequency heating current conductively applied by the use of contacts connected with the terminals of a high frequency generator and applied respectively at opposite sides of a V-shaped gap in the metal tubing shortly in advance of a weld point as the tubing is rapidly advanced. By such method the heating current flowing in opposite directions at any moment on the opposite edges of the gap, becomes closely concentrated on the surfaces of such edges by reason of mutual inductance, so that only the very edge surfaces are heated up to welding temperature upon reaching the weld point. With such methods, the tube gap is closed at or adjacent the weld point by the use of so-called "squeeze" or pressure rollers engaging the opposite exterior side walls of the tubing.

The present invention relates to improvements or alternative forms of such methods and apparatus, the improvements being such as particularly to adapt same for welding tubing without scratching or marring the surfaces thereof and for welding tubing of small diameters efficiently and at high speed. The invention is particularly well adapted for welding of non-ferrous metals such as copper or aluminum or alloys thereof or other metals which may become easily scratched or marred.

The invention is further well adapted for the welding of tubing formed of metals having high thermal conductivity and with which it is desirable to so apply the heating current as to enable heating the gap edges to welding temperature so rapidly in advance of the weld point that the heat will not have opportunity to become conducted away from the gap edges or cause overheating or softening of the metal other than on the edge surfaces which are to be welded together under pressure with a so-called "forged type" of weld.

Heretofore with the known methods above referred to, the contacts for applying the high frequency current have ordinarily been arranged slidably to engage the metal at the gap edges, and in advance of the pressure rollers and this arrangement has proven in most cases to be highly satisfactory. However, after extended use, due to slightly irregular movements or vibration of the advancing metal tubing, the contacts may become somewhat irregularly worn, so that as the tube metal leaves the trailing edge of the contacts, such contacts may cause noticeable scratching or marring of the tube metal either because of slight mechanical abrasion or possibly sometimes by reason of some slight arcing, particularly if the tube metal is relatively soft or is easily melted or is otherwise not resistant to marring or scratching. Also, it has been heretofore proposed to use roller contacts instead of sliding contacts for the purpose and located at positions substantially in advance of the squeeze rollers or weld point, but such roller contacts in that position have generally met with further difficulties.

However, in accordance with the present invention, it has unexpectedly been found possible to obtain surprisingly good results, avoiding the above noted difficulties, by using in a suitable way the squeeze rollers, which act to close the gap at the weld point, for the additional purpose of acting as contacts for applying the high frequency current to the opposite sides of the tube gap and yet at points sufficiently in advance of the weld point so that the path of the heating current will be from the points of application thereof, to and from the weld point, without the use of any additional contact means engaging the tubing in advance of the weld point, other than the portions of the squeeze rollers themselves. Instead of applying the high frequency current directly to the work by the use of sliding contacts, one may, in accordance with the present invention, utilize sliding contacts for applying the current to the squeeze rollers at the proper points and so that it will flow thence down onto the approaching gap edges along same to and from the weld point for a sufficient distance to accomplish the desired heating to welding temperature at the weld point.

The squeeze rollers should be of relatively large diameter as compared with the diameter of the tubing being welded and such rollers may conveniently be formed with peripheral grooves, which conform to a semi-circular shape in across-section. With the rollers properly shaped and positioned, the metal tubing may be advanced therebetween in such manner that initially only the upper portions of the tubing at opposite sides of the gap and the bottom portion of the tubing, will engage the surfaces within the roller grooves and such engagement, as well as later disengagement following the weld point, will be smooth and such as not to cause scratching or marring of the tube metal. The side sufaces of the tubing will actually be spaced from the surfaces of the squeeze rollers within the channels thereof, except at substantially the moments of final closing of the tube gap. Thus as the tubing enters between the squeeze rollers, a substantially ideal conductive path for the current is applied along the opposite edge surfaces of the tube gap to and from the weld point, and since the tube metal is effectively embraced by the rollers and thus is kept under pressure and its movement effectively controlled against irregularities as it passes the weld point, the grooves in the large squeeze rollers can be maintained in smooth condition, and the tube metal is left free of abrasions and scratches as it passes.

Also in accordance with the invention, it is possible to bring the points of contact of the high frequency current with the tube metal very close to the weld point and still utilize sufficient current quickly to heat the tube gap edges to welding temperature before heat from the edges has opportunity to be conducted away and cause softening of the metal where that is undesired, that is, at points spaced in depth from the very edge surfaces. This not only facilitates the welding of metals of high thermal conductivity, but also makes it possible to provide a heating current path on the gap edges where desired and which will be so short and have such a low impedance that there will be very little tendency for any waste heating current to flow from the points of application circumferentially around the back of the tubing along paths of greater inductance. This fact makes it possible efficiently to use the invention for welding tubing of quite small diameter with which it would be difficult or impossible to insert impedance or core means as has been often done with tubing of large diameters to prevent such waste flow of current around the back of the tubing.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of a preferred embodiment of the apparatus for carrying out the invention;

FIG. 2 is a vertical sectional view taken substantially along line 2—2 of FIG. 1;

FIG. 3 is a view similar to FIG. 2, but showing a somewhat modified form of the invention;

FIG. 4 is a somewhat schematic plan view of the arrangement of FIG. 1; and

FIGS. 5, 6 and 7 respectively are vertical sectional views taken substantially along the lines a—a, b—b and c—c of FIG. 4.

Referring now to FIGS. 1 and 2 in further detail, a strip of sheet metal or skelp is indicated at 10, as same is being formed into tubing with a V-shaped gap as at 11, and while being advanced between a pair of pressure rollers as at 12 and 13, past a point of welding at w. The skelp 10 may, of course, be shaped by suitable known arrangements of rollers, into generally tubular form prior to its reaching the apparatus shown in FIG. 1.

The pressure rollers 12, 13 are preferably formed on their peripheries with grooves as at 12', 13', such that the groove surfaces will conform to a circle when the rollers are viewed in vertical section and with the plane of the section extending radially from the axis of the roller. The upper peripheral portions of the rollers are preferably formed with annular, flat-surfaced flanges as at 14, 15, against which respectively two contacts 16, 17 are so mounted that shoes thereof as at 16', 17' will engage such flanges. These contacts may be of a fluid-cooled type and same are respectively connected to the terminals of a high frequency generator as indicated at 18. The current frequency used is preferably in the range of several hundred thousand cycles per second, for example 350 to 450 kilocycles, although in some cases lower frequencies of about 50,000 cycles or higher might be employed.

The amount of high frequency power required, and the preferred speed of movement of the advancing tubing, may be readily determined by trial and in general accordance with the practice heretofore followed in the prior known method hereinabove referred to, wherein high frequency heating current is conductively applied for welding the tubing. The rollers 12, 13 may be suitably driven or if desired act as idler rollers if the tubing is being pulled through the apparatus by other means of known form, not shown.

As above mentioned, the pressure rollers 12, 13, however, should ordinarily be relatively larger than customary with said heretofore known method, for example in a typical case, for welding tubing one inch in diameter with the present invention, the rollers may be some fourteen inches in diameter, more or less. In such a case, the distance between the trailing edges of the contact shoes 16', 17' to the point w may be from three-quarters of an inch to one inch, but such dimensions may be varied considerably.

As shown in FIG. 5 (a vertical section taken approximately along line a—a of FIG. 4), the tubing 10 here has come into contact with the rollers 12 and 13 at a region close to the contact shoes, but such contact with the tubing only occurs as at 20, 21 along close to the upper portions of the edges at the tube gap 11 and also along portions as at 22 and 23 on the opposite or underside of the tubing. At this position, the side wall portions as at 24 and 25 of the tubing, will not as yet come into contact with the surfaces of the rollers within the grooves 12' and 13'. This results from the fact that the grooves are, of course, annular, and of circular cross-section whereas the longitudinal elements of the tubing are advanced toward the weld point along lines which are nearly perpendicular to a vertical plane passing through the axes of the rollers. Also the contacting of the tube metal with the rollers only at the regions indicated at 20–23 inclusive, arises in part from the fact that the tubing at this position still has a gap 11 and is not thus as yet formed with a completely circular cross-section.

As shown in FIG. 6 (which is a section taken substantially along line b—b of FIG. 4), the tube gap 11 here has become more nearly closed and the tube metal contacts with the rollers at regions indicated at 21' to 23' inclusive, whereas the surfaces of the tubing at the sides at 24', 25' have not yet come into contact with the rollers. However, as shown in FIG. 7 (which is a section taken just following the point w), the gap in the tubing 12 has become closed and the outer wall surfaces of the tubing throughout the circumference thereof have come into contact with the surfaces within the grooves of the rollers 12 and 13.

The above-described manner in which the tubing engages the pressure rollers when the parts are arranged to coact as shown, is believed to contribute materially to the successful results achieved by the use of the invention. The path of the high frequency current at any one moment may be traced, for example, from the contact 16 onto the flat flange surface 14 of roller 12, thence immediately down over the edge portion of that flange, as indicated at 30 in FIG. 5 and then onto the edge 31 of the tube gap 11, thence along such edge to the point w, and back on the opposite tube gap edge 32, and to the surfaces, 33, 34 of the roller 13 to contact 17. The length of the current paths between the contacts and the weld point may be kept so relatively short and have such low impedance as compared with any current paths around on the opposite or under surface of the tubing, that very little current will be wasted by following any such circumferential paths. Also the points of initial contact between the rollers and the tube metal at opposite sides of the gap, viz., at the points 20 and 21, will be so close to the metal edges and so close to the position of the final weld line, that even if any slight marring or scratching should be caused, same will be so close to the weld line that the blemish may be removed along with the removal of any upset metal along the weld line in the finishing of the tubing.

It may also be noted that the points of contact at 20 and 21, or thereabouts, between the rollers and the tube gap edges, may be so close to the edges that the current will flow from the flange edges 30, 33 on the rollers, almost directly onto the tube gap edges without any substantial loss, inasmuch as mutual inductance between the current flowing on opposite sides of the gap at any one moment in opposite directions, causes the current very effectively to be concentrated on the gap edge surfaces 31, 32 rather than straying to either side of the gap. Also from inspection of FIG. 4, it will be noted that the peripheries of the flanges on the rollers respectively approach each other more and more closely, as the tube gap edges also approach each other more and more closely, but the edges of the rollers preferably do not at any point come quite as close together as do the tube gap edges, and thus by reason of the mutual inductance on the gap edges, the current is concentrated on the edge surfaces without substantial interference by reason of the close presence of the roller flanges. Yet the roller flanges come closer and closer together and serve to retain the tube gap edges firmly under control and free of displacement or vibration as they advance and become welded together.

A further advantage which is inherent with the invention concerns its possibilities for continuing the welded seam up to substantially the very trailing end of the tube 10 as same approaches the weld point. That is, upon examining FIG. 4 for example, it will be noted that as the tubing which is being welded advances to a point where its trailing end passes the region of the transverse vertical plane in which contacts 16', 17' are located then if said contacts were applied directly to the edges of the gap in the tubing, the circuit would be interrupted so that the trailing end portion of the seam would remain unwelded. However, with the contacts 16', 17' located as shown to engage the periphery of the rollers, the high frequency circuit will still remain in operative condition for continuing to heat the edges of the gap until the very end portions or trailing portions thereof arrive at the weld point. The current path will run for example from the contact 16' to the periphery of roller 12, thence along such periphery to the trailing end of one gap edge, thence along such edge to the weld point and back along the opposite edge to its trailing end, thence to the periphery of the roller 13 and to the contact 17'.

The alternative embodiment shown in FIG. 3 is similar to that of FIG. 2, like parts bearing the same reference numerals, but in FIG. 3, each of the contacts 16 and 17 is formed with overhanging portions as at 35, 36 so that the current on the contacts 16, 17, because of the proximity effect, will be brought down around on the surface portions 36 and 37, and this in turn, also by reason of the proximity effect, will cause the current to flow from the roller flanges more readily and directly onto the tube gap edges, thus insuring that the current will flow from points beneath the contacts 16, 17, almost immediately onto the tube gap edges with a minimum of loss.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together the edges of a longitudinally extending narrow V-shaped gap in metal tubing as the tubing is advanced longitudinally past a point of welding at the apex of such gap, which apparatus comprises in combination: cooperating peripherally grooved pressure rollers for engaging opposite sides of the tubing at and adjacent the region of said point and for causing the closing of such gap at or adjacent said point; a pair of contacts connected respectively to the terminals of a source of current of a frequency of 50,000 cycles per second or higher, said contacts being mounted respectively to engage peripheral portions of such rollers at points in advance of said point of welding, thereby to provide for a flow of heating current of such frequency along a path extending from one of said contacts onto the periphery of one of said rollers, thence to the tube metal at a point in advance of the point of welding, thence along one edge surface of said gap to the point of welding, thence back along the other edge surface of said gap and to the periphery of another of the rollers and to the other contact.

2. Apparatus for welding together the edges of a longitudinally extending narrow V-shaped gap in metal tubing as the tubing is advanced longitudinally past a point of welding at the apex of such gap, which apparatus comprises in combination: a pair of pressure rollers for engaging opposite sides of the tubing at and adjacent the region of said point and for causing the closing of such gap at or adjacent said point, said rollers being peripherally grooved with grooves of substantially semi-circular cross-section whereby surface portions of the tubing along adjacent the gap initially contact with surfaces at points within the grooves while side surfaces of the tubing remain spaced from the surfaces within the mid-portions of the grooves; a pair of contacts connected respectively to the terminals of a source of current of a frequency of 50,000 cycles per second or higher, said contacts being mounted respectively to engage peripheral portions of such rollers at points in advance of said point of welding, thereby to provide for a flow of heating current from said contacts onto the peripheries of said rollers, thence to the tube metal at said points of initial contact and along the edge surfaces of said gap to and from the point of welding, the current flowing at any moment in opposite directions respectively on the opposed edges of the gap.

3. Apparatus in accordance with the foregoing claim 1 and in which said rollers adjacent their peripheries are formed with annular flange-like surfaces and said contacts respectively are mounted slidably to engage said flange-like surfaces.

4. Apparatus in accordance with the foregoing claim 1 and in which said contacts are formed with dependent portions respectively extending down into close proximity to the edges of the tubing at opposite sides of said gap.

5. Method for welding together the edges of a longitudinally extending V-shaped gap in metal tubing, while advancing said tubing longitudinally past a point of welding, said method comprising: engaging the opposite sides of said tubing at regions along adjacent the gap edges thereon respectively and in advance of said point with spaced apart members having conductive surfaces which advance with the tubing and concurrently converge sufficiently to cause the tube gap edges to be pressed together at or adjacent said point; and applying the terminals of a source of electrical heating current of a frequency of 50,000 cycles per second or higher to said members respectively at points substantially in advance of said point, whereby such current will flow from the points of application thereof to said members, and from the latter thence along the edge surfaces of said gap to and from said point for heating said edges to welding temperature upon reaching said point.

6. Method for welding together the edges of a longitudinally extending V-shaped gap in metal tubing as the tubing is advanced longitudinally past a point of welding, which method comprises: applying pressure by the use of conductive means respectively for engaging opposite sides of the tubing at and prior to the region of said point for the closing of such gap at or adjacent said point, said conductive means being caused to travel along in engagement with the tubing from points substantially in advance of said weld point and at least to the region of such point, and applying to said means respectively at points substantially in advance of the weld point the terminals of a source of current of a frequency of 50,000 cycles per second or higher, thereby to provide for a flow of heating current along a path extending from one of said terminals onto and along one of said conductive means thence to the tube metal at a point in advance of the point of welding, thence along one edge surface of said gap to said point, thence back along the other edge surface of the gap and to the other of said conductive means thence along on the latter to the other of said terminals, the gap edges in advance of the weld point being more closely spaced than the conductive means, whereby the high frequency current, due to mutual inductance is closely concentrated along on said edges.

7. Method in accordance with the foregoing claim 6 and in which as the trailing end portions of the metal tubing closely approach the weld point, the said flow of heating current is continued along said path as specified, substantially until the trailing edge portions of the gap reach the weld point.

References Cited in the file of this patent

UNITED STATES PATENTS

| | | |
|---|---|---|
| 1,510,932 | Gail | Oct. 7, 1924 |
| 2,794,108 | Park | May 28, 1957 |